April 25, 1972 K. D. BROADBENT 3,658,954

DUPLICATING PROCESS FOR VIDEO DISC RECORDS

Filed July 24, 1968

INVENTOR
Kent Broadbent
Jessup and Beecher
By Keith D. Beecher
ATTORNEYS

United States Patent Office 3,658,954

Patented Apr. 25, 1972

3,658,954
DUPLICATING PROCESS FOR VIDEO DISC RECORDS

Kent D. Broadbent, San Pedro, Calif., assignor to MCA Technology, Inc., Santa Monica, Calif.

Filed July 24, 1968, Ser. No. 747,251
Int. Cl. B29d *11/00*
U.S. Cl. 264—1 4 Claims

ABSTRACT OF THE DISCLOSURE

A duplicating process for forming duplicate plastic records from a video recording master die is provided. The process involves subjecting the surface of the die to an appropriate vapor, and irradiating the vapor so as to form a film on the surface of the die having holes or depressions therein which are formed by the die, and which are representative of the video recordings of the die. A backing is subsequently applied to the film, the backing being composed, for example, of a transparent material having the same coefficient of refraction as the film, and the resulting combination is subsequently removed from the surface of the die.

RELATED COPENDING APPLICATIONS

Ser. No. 507,474, filed Nov. 12, 1965, now abandoned; Ser. No. 627,701 filed Apr. 3, 1967, now Pat. No. 3,430,-966; Ser. No. 741,020, filed June 28, 1968; Ser. No. 735,-007, filed June 6, 1968.

BACKGROUND OF THE INVENTION

A transparent plastic video record disc is described in copending application Ser. No. 627,701 in which picture information in the form of video signals is optically recorded on one or both sides of the disc. This optical recording extends along a spiral track on the surface of the disc, and it comprises a series of transparent grooves along the track, with interposed opaque areas, the transparent grooves having individual lengths representative of the recorded picture information.

The picture information recorded on the video record disc is intended to be reproduced, for example, through a home television receiver, or by other appropriate reproducing equipment. The reproduction is achieved by rotating the video record disc on a turntable and by directing a light beam through the disc, as described in copending application 507,474. The light beam is modulated by the video recordings on the disc, and a pick-up head is provided which responds to the resulting light signals to transform the light signals into corresponding electrical video signals for playback purposes.

The present invention is concerned with a duplication process by which a multiplicity of such video record discs may be mass produced from a master record die. In the prior art phonograph duplicating process, a "biscuit" of vinyl or other plastic material is placed in a "stamper," and a heated master record die is brought down into the surface of the biscuit. The plastic at the biscuit surface is melted and caused to flow radially into the spaces defined by the impressions on the master die surface. However, his stamping technique as it is now generally practiced does not appear to be suitable for the extremely fine micro-spiral grooves required for video frequency recording.

The process to be described herein, for example, is one in which the surface of the master record is placed in contact with a suitable monomer vapor, and the vapor is irradiated to cause it to polymerize on the surface of the master die so as to form a film on that surface bearing the video recordings of the master. As mentioned above, a suitable backing is then formed over the film, and the combination is removed from the die for further treatment, as will be described. The films produced by such a process are capable of providing recording definitions well beyond the micro-requirements of the present day video records. Moreover, the basic simplicity of the process makes it eminently suited for the production of video disc records on a mass production basis.

A transparent polymer dielectric film may be formed on the master die, for example, by exposing the surface of the die to a monomer vapor and by photon irradiation of the exposed surface. For example, the formation of thin polymer films using three different monomers irradiated by ultraviolet energy from a mercury arc is described in an article by L.V. Gregor and H. L. McGee in "Proceedings of Electronbeam Symposium, Fifth Annual Meeting," Mar. 28, 29, 1963, Boston Mass.—editor, J. R. Morley, published by Alloyd Electronics Corporation of Cambridge, Mass., in April 1963. Other works describe the use of X-rays and gamma rays to polymerize monomer vapors onto surfaces exposed to such vapors.

One possible embodiment of the process of the invention, whereby a film is produced on the surface of a master-die, involves a monomer vapor such as acrolein ($CH_2$=CH—CHO) in contact with the surface of the master die at a pressure of several millimeters of mercury and subjecting the surface of the die to ultraviolet radiations. Once a sufficiently thick film is polymerized on the surface of the die, it may be backed by a suitable transparent plastic material of the same index of refraction, and the resulting combination may then be removed from the master die surface for further treatment, as will be described.

As an alternative, the Union Carbide Corporation has recently developed a new high purity thermoplastic polymer series which is produced in a sensitively controlled vapor-phase reaction system, and which is identified by the generic term "parylene." The series makes possible the reproduction of polymer film coatings of dimensions less than 1,000 angstroms. Such dimensions are not possible with other materials in which the vapor contains a conglomeration of reactive radicals and non-reactive molecules. With the other materials a steady state does not exist, and the actual composition of the vapor can never be fully known or controlled. The parylene vapor, on the other hand, is pure and its composition is known and controllable. When such a material is used in the process referred to above, a much better quality polymer may be deposited on the master die, and with finer definition, than with other known materials. In fact, the resolution capabilities when the parylene vapor is used are well beyond the resolution required for the usual video recordings which utilize, for example, transparent areas of one micron diameter.

When the aforesaid film is formed on the master die and the backing applied, and when the combination is removed from the die, the resulting disc record may be further processed as described, for example, in copending application Ser. No. 735,007. That is, the surface of the disc record may be "shadow plated" to yield an optically opaque surface with the aforesaid transparent grooves extending around a spiral recording track, the grooves having varying lengths, as mentioned above, representative of the video intelligence.

DETAILED DESCRIPTION OF THE ILLUSTRATED EMBODIMENT

Figure 1:
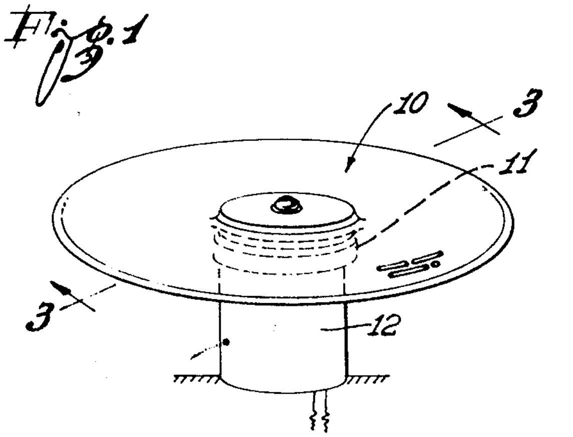
FIG. 1 is a perspective representation of a video record disc which may be constructed in accordance with the process of the present invention, the disc being shown as mounted on an appropriate turntable.

The apparatus shown in FIG. 1 includes a video record disc 10 which may be constructed in accordance with the process of the present invention, and which has video signals optically recorded thereon. The video signals are recorded on the video record disc 10, as will be described, in a recording track which extends as a micro-spiral from the outer periphery of the disc towards its center. The spiral recording track on the disc 10 may have a width, for example, of the order of 1 micron, and the spacing between adjacent convolutions of the spiral may also be of the order of 1 micron.

Figure 2:
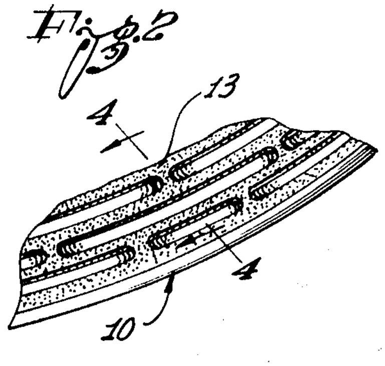
FIG. 2 is a fragmentary representation of the video record disc shown in FIG. 1, on an enlarged scale.

As mentioned above, and as shown in the enlarged representation of FIG. 2, the recordings on the video record disc are in the form of transparent grooves having individual lengths which vary in accordance with the variations in the recorded video signals. The video recording disc 10 is supported on a turntable 11 which, in turn, is rotatably driven by an electric motor 12. The motor 12 may rotate the turntable at a relatively high speed, for example, in the range of 900–3600 r.p.m.

Figure 3:
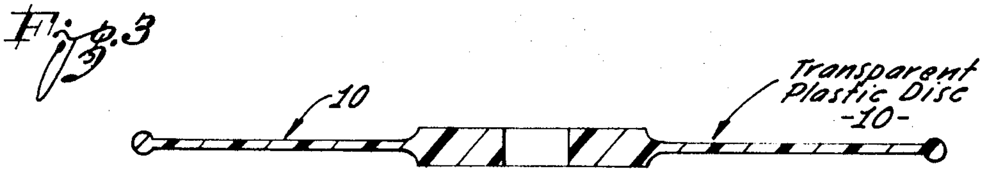
FIG. 3 is a side section of the video record disc of FIG. 1, taken essentially along the line 3—3 of FIG. 1.
Figure 4:
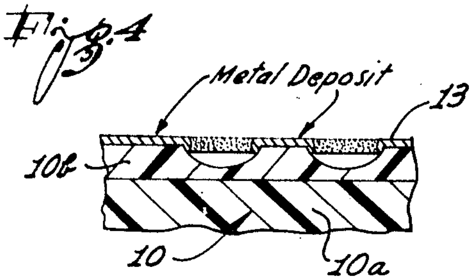
FIG. 4 is a section of the video record disc shown in FIG. 2, on an enlarged scale, and taken along the line 4—4 of FIG. 2.

The video record disc may have a cross sectional configuration as shown, for example, in FIG. 3. A metallic deposit is placed over portions of the upper surface of the disc, as designated 13 in FIG. 3, so as to provide the discontinuous transparent grooves mentioned above. When formed by the process of the present invention, the video record disc 10 has a laminated structure as shown in enlarged sectional view of FIG. 4.

That is, the video record disc 10 is composed of a first portion **10*a* which constitutes a backing for a second portion, namely a film 10*b*. The backing portion 10*a* and film 10*b* preferably are of a transparent plastic material and both have the same coefficient of refraction. As will be described, the film 10*b* if formed over the face of a master die by the polymerization process of the present invention, and the backing 10*a*** is then applied to the film, with the resulting combination being subsequently removed from the die.

A metallic deposit 13 is then selectively placed on the high relief portions of the film **10*b*, the high relief portions being interposed between grooves or actual holes in the film, these grooves or holes being formed by the video recordings on the surface of the master die. After the opaque metallic deposit 13** has been applied to the high relief portions of the video record disc, the aforesaid video recordings appear as micro-grooves in which the transparency is retained, and which have varying lengths, depending upon the variations in the recorded video signals and the grooves extend along a micro-spiral recording track, as pointed out previously herein.

Figure 5:
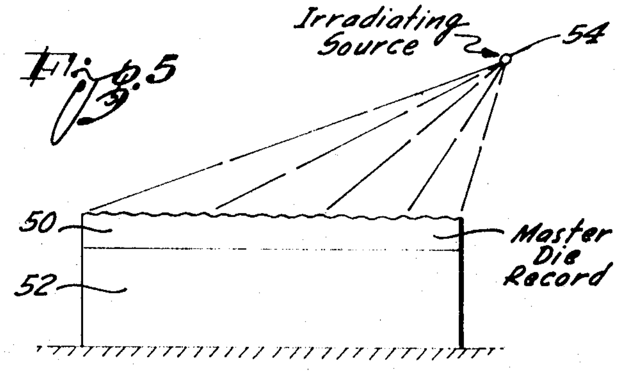
FIG. 5 is a schematic representation showing a step in the process of the present invention.

As mentioned above, and as shown schematically in FIG. 5, the video record discs of the present invention are formed by subjecting the surface of a master die 50 to a selected monomer vapor, for example. The master die may be mounted on an appropriate support 52, as shown in FIG. 5. The surface of the die bears recordings in the form of individual projections extending around a micro-spiral, and which have individual lengths corresponding to the video signals to be duplicated onto the video disc records to be formed by the process of the invention.

As shown in FIG. 5, the aforesaid surface of the master die 50 is subjected to a selected monomer vapor, for example, as described previously herein, is then irradiated, for example, by ultraviolet from an irradiating source 54, so that the monomer vapor is caused to polymerize on the surface of the die. This causes a film to be formed on the surface of the master die, with holes or grooves being formed in a microspiral on the film, corresponding to the aforesaid projections on the die surface. Then, a suitable backing of, for example, an acrylic resin, is applied to the film by any appropriate and known means and the combination is removed from the die surface, so as to provide a plastic video record disc, of the type shown in section, for example, in FIGS. 6A and 6B. The record disc includes a backing **10*a* with a film 10*b*** formed on its upper surface, the latter film having grooves or holes therein corresponding to the pulse recordings on the master die.

The combination is then subjected, for example, to the process described in copending application 735,007 whereby an opaque metallic deposit 13 is formed on the high relief areas of the film. This may be achieved, for example, as described in the copending application 735,-007, by placing the resulting video record disc 10 on a suitable turntable in a vacuum deposition chamber, and causing it to turn. The source of the radiated metal, designated 60, is offset from the center of the disc 10 and raised slightly above its surface, as shown.

Figure 6:
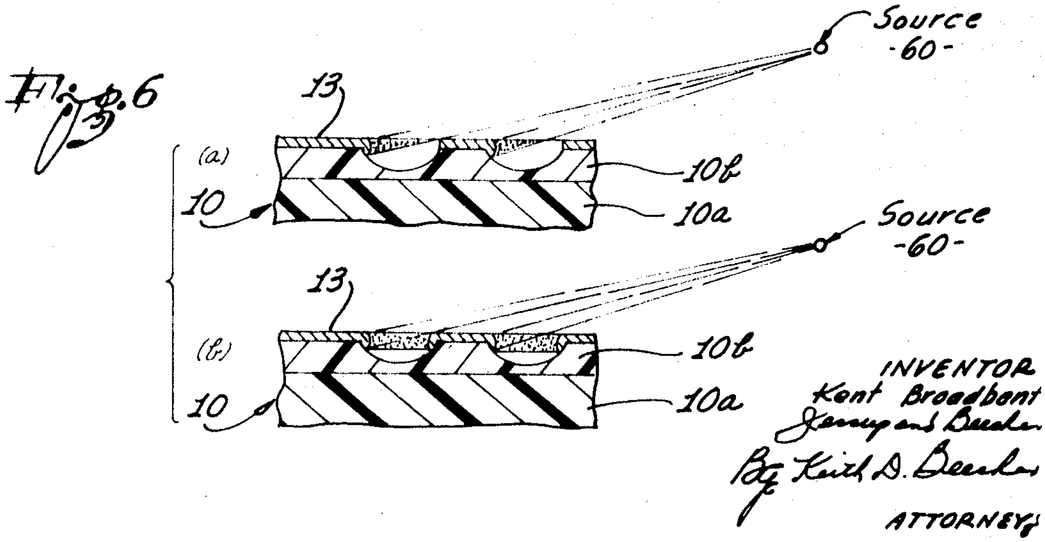
FIGS. 6A and 6B show various steps by which a surface opaque layer may be deposited over selected portions of the record disc formed by the process of the invention.

The angle formed between the surface of the film **10*b* on the disc 10 and the source of the radiated metal is designated in FIGS. 6A and 6B. If this angle is fairly small, then the radiated metal will be formed on the upper sides of the grooves in the film 10*b***, first on one side as shown in FIG. 6A, and then on the other side as the record rotates, as shown in FIG. 6B.

Therefore, as the metal deposition process continues and as the video record disc 10 rotates, a thin opaque deposit of metal will be formed on the top edges of the micro-grooves in the film **10*b*, and also on the upper flats or high relief areas of the film surface. This metal deposit forms the desired selective opaque coating over the video disc record, so that the recordings in the micro-spiral recording track in the film 10*b*** are exhibited as transparent length modulated grooves, representing the recorded video signals.

It will be appreciated, of course, that other means may be used to apply a selective opaque deposit over the high relief areas of the film **10*b*. It will also be appreciated that materials other than those described specifically above may be used in the process of the invention for polymerizing or otherwise forming the film 10*b*** on the master die surface.

The invention provides, therefore, an improved simplified process whereby video disc records may be produced having video signal recordings on one or both surfaces with high resolution, the process being capable of duplicating a master die into a multiplicity of video disc records, quickly and conveniently, and on a mass production basis.

While various embodiments of the process have been suggested, it will be appreciated that others may be used. The following claims are intended to cover the processes with the scope intended to embody all equivalents falling within the invention.

What is claimed is:

1. A process for forming a disc record having video information optically recorded thereon and which comprises: subjecting the surface of a master record die to the vapor of a selected polymerizing material; causing the vapor to polymerize on the aforesaid surface of the master record die to form a transparent film having a particular index of refraction, and having depressions therein formed by said die and representing the aforesaid video information; applying a transparent backing of the same index of refraction to said film on the surface of said master die; removing the combined film and backing from said surface of said master die; and forming an opaque coating over the surface of said film other than the portions thereof corresponding to said depressions.

2. The process defined in claim 1 and which comprises subjecting said surface of said master die to a monomer vapor, and irradiating said vapor with ultraviolet radiations to polymerize said vapor on said surface of said master die.

3. The process defined in claim 2 in which said monomer vapor is acrolein.

4. The process defined in claim 2 in which said monomer vapor is of the parylene series.

References Cited

UNITED STATES PATENTS

| | | | |
|---|---|---|---|
| 3,475,266 | 10/1969 | Strassel | 264—255 X |
| 2,464,738 | 3/1949 | White | 264—81 X |
| 2,956,899 | 10/1960 | Cline | 264—22 UX |
| 3,068,510 | 12/1962 | Coleman | 264—81 X |
| 3,250,642 | 5/1966 | Paraoacco | 264—25 X |
| 3,280,230 | 10/1966 | Bradshaw | 264—22 |
| 3,379,803 | 4/1968 | Tittmann | 264—81 |
| 3,381,086 | 4/1968 | Moss | 179—100.3 X |
| 3,430,966 | 3/1969 | Gregg | 178—5.4 |

DONALD J. ARNOLD, Primary Examiner

A. M. SOKAL, Assistant Examiner

U.S. Cl. X.R.

156—242; 264—22, 81, 129